United States Patent Office 3,126,375
Patented Mar. 24, 1964

3,126,375
CYCLIC KETALS OF 6 HALO CORTICOIDS
Howard J. Ringold, John A. Zderic, Carl Djerassi, and Albert Bowers, all of Mexico City, Mexico, assignors, by mesne assignments, to Syntex Corporation, a corporation of Panama
No Drawing. Filed June 11, 1959, Ser. No. 819,545
Claims priority, application Mexico June 13, 1958
35 Claims. (Cl. 260—239.55)

The present invention relates to cyclopentanophenanthrene compounds. More particularly the present invention relates to cyclic 16α,17α-ketals and 16α,17α-acetals of 6α-halo (fluoro or chloro) of hydrocortisone, cortisone, prednisolone or prednisone and of the 9α-halo (fluoro or chloro) derivatives thereof.

The novel compounds described above have anti-inflammatory, glycogenic, thymolytic, anti-estrogenic and anti-androgenic activity. These compounds are further illustrated by the following formula:

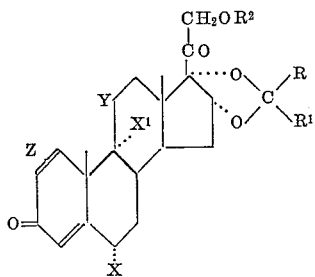

In the above equation R and $R^1$ may be hydrogen or the residue of a hydrocarbon of up to 8 carbon atoms of straight, branched, cyclic or mixed aliphatic-cyclic chain, saturated or unsaturated including aromatic groups, as will be hereinafter set forth in detail. X represents fluorine or chlorine. $X^1$ represents hydrogen, fluorine or chlorine. Y represents =O or β-OH. Z represents a double bond between C–1 and C–2 or a saturated linkage between C–1 and C–2. $R^2$ represents hydrogen or a hydrocarbon carboxylic acyl group of up to 12 carbon atoms.

One of the processes for the production of the aforementioned compounds is illustrated by the following equation:

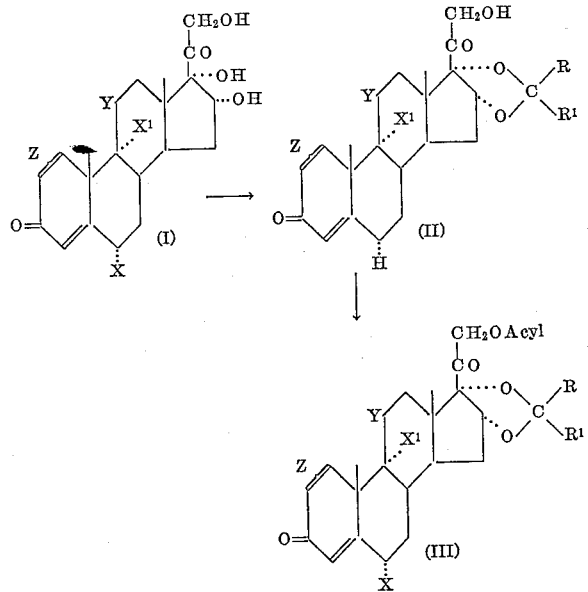

In the above equation Z, Y, $X^1$, X, R and $R^1$ represent the same groups as heretofore and acyl represents a hydrocarbon carboxylic acyl group of up to 12 carbons.

The novel compounds were obtained by treatment of a compound of Formula I with an aldehyde or a ketone under anhydrous conditions and in the presence of a catalyst, such as copper sulfate (cf. Euw and Reichstein, Helv. Chim. Acta, XXIII, 1114 (1940)), dry hydrogen chloride (Huffman et al., J. Am. Chem. Soc., 71, 719 (1949)), or perchloric acid (Fried et al., J. Am. Chem. Soc., 80, 2338 (1958)), without using a solvent or in the presence of a solvent inert to this reaction, such as dioxane. The starting materials have been previously described in U.S. patent applications of Ringold and Bowers, Serial No. 762,232, filed September 22, 1958, and of Ringold, Mancera and Kincl, Serial No. 753,626, filed August 7, 1958, now U.S. Patent No. 2,997,489.

The new ketal or acetals may be considered as 16α,17α-methylenedioxy compounds wherein the methylenedioxy group is bound with its oxygens to positions C–16α and C–17α of the steroid and wherein one or both hydrogen atoms of the methylenedioxy group may be substituted with the residue of a hydrocarbon, saturated or unsaturated, of straight or branched chain, cyclic or of a chain combining these configurations, according to the aldehyde or ketone used for the condensation.

To name some examples; formaldehyde gave (II) with $R=R^1=H$, paraldehyde gave (II) with $R=H$, and $R^1=Me$, acetone gave (II) with $R=R^1=Me$ (namely an acetonide), benzaldehyde gave (II) with $R=H$, $R'=C_6H_5$, acetophenone gave (II) with $R=Me$ and $R'=C_6H_5$, diethylketone gave (II) with $R=R'=Et$, chloroacetone gave (II) with $R=CH_2Cl$ and $R^1=Me$, and furfural gave (II) with $R=H$, and

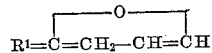

By routine methods, for example by reaction with the anhydride of a carboxylic acid, in pyridine solution, we esterified (II) at C–21 to produce the corresponding 21-esters of Formula III; the anhydride may be derived from any hydrocarbon carboxylic acid having up to 12 carbon atoms, saturated or unsaturated, of straight or branched chain, cyclic or mixed cyclic-aliphatic, substituted or not with methoxy, halogen or other groups, to produce, among other 21-esters, the acetates, propionates, butyrates, hemisuccinates, caprates, benzoates, trimethylacetates, phenoxyacetates, cyclopentylpropionates, phenylpropionates and β-chloropropionates.

Alternatively, we can start from such 21-esters of (I), described for the 16α-hydroxy compounds fluorinated at C–6α, and the ester group at C–21 can then be hydrolyzed on the condensation product, for example by reaction with sodium methoxide in methanol solution at low temperature, under an atmosphere of nitrogen and under anhydrous conditions.

It is obvious that our invention can also be applied to the 6α-bromo compounds corresponding to Formula I, or to the analogs of the compounds of Formula I having a bromine atom at C–9α.

The following equation illustrates another method for the production of certain 6α-chloro compounds of the present invention. Of these compounds the 21-acetates of the 16α,17α-acetonides of 6α-chloro-9α-fluoro-16α-hydroxy-hydrocortisone and of 6α-chloro-9α-fluoro-16α-hydroxy-prednisolone are particularly remarkable as regards their thymolytic activity which is from 60 to 300 times that of hydrocortisone.

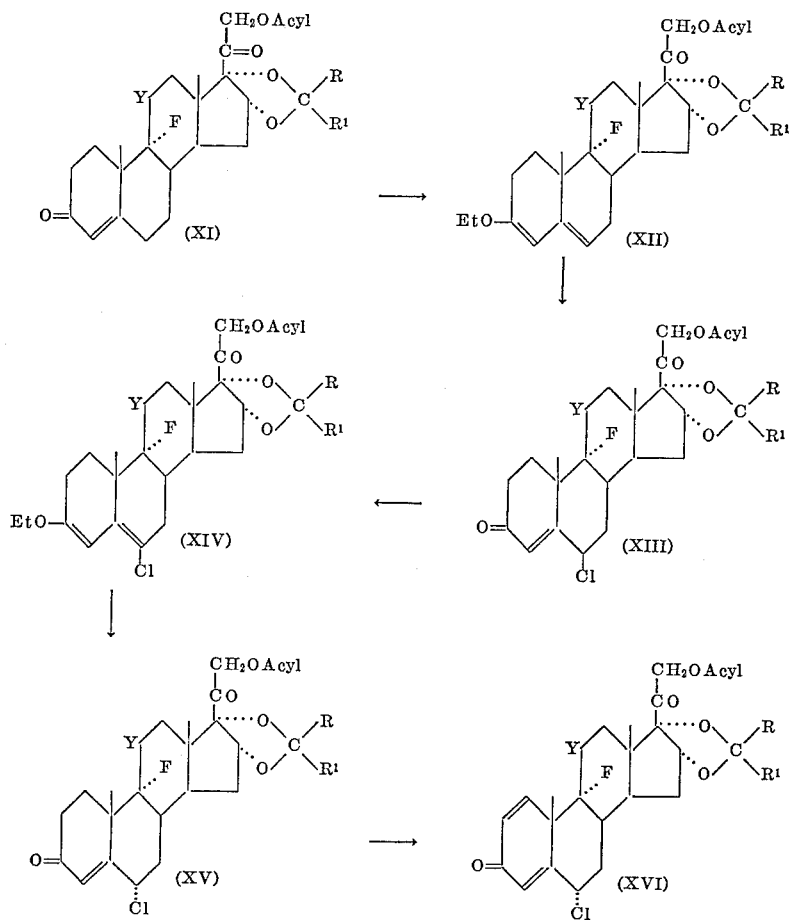

In the above equation the symbols indicate the same group as before.

As starting materials in the method of the present invention we employed the 21-acetates of the 16,17-ketals and -acetals of 16α-hydroxy-hydrocortisone and of 16α-hydroxy-cortisone. By following the procedure of Fried et al. (J. Am. Chem. Soc. 80, 2338 (1958)), we prepared the 16,17-ketals and 16,17-acetals of 16α-hydroxy-hydrocortisone which were esterified and, optionally, the β-hydroxyl group at C–11 was oxidized to the keto group.

The starting compounds (XI) were converted into their 3-enol-ethers (XII) by reaction with ethyl orthoformate in mixture with dioxane and in the presence of p-toluene-sulfonic acid. The enol-ethers were allowed to react with hypochlorous acid, using for this reaction N-chlorosuccinimide in mixture with aqueous acetone and in the presence of acetic acid and sodium acetate. Thus we produced the 21-acetates of the 16α,17α-ketal or acetal of 6β-chloro-9α-fluoro-16α-hydroxycortisone and of the corresponding hydrocortisone, represented by Formula XIII. The keto group at C–3 was enolized again by the aforementioned reaction with ethyl forthoformate and the enol-ether group was hydrolized again by treatment with small amounts of dilute hydrochloric acid in mixture with acetic acid. This hydrolysis causes the inversion of the steric configuration at C–6 and there are thus obtained the desired 6α-chloro compounds: the 21-acetates of the 16α,17α-ketals or -acetals of 6α-chloro-9α-fluoro-16α-hydroxy-cortisone or -hydrocortisone, represented by Formula XV.

An additional double bond can then be introduced between C–1 and C–2 by microbiological methods, such as incubation with *Corynebacterium simplex* ATCC 4964, or by purely chemical methods. We successfully effected this transformation by refluxing with selenium dioxide in mixture with t-butanol, in the presence of catalytic amounts of pyridine and under an atmosphere of nitrogen. Thus we obtained the 21-acetates of the 16α,17α-ketals or acetals of 6α-chloro-9α-fluoro-16α-hydroxy-prednisolone or prednisone (XVI).

The following specific examples serve to illustrate but are not intended to limit the present invention.

Example I

To a mixture of 3 g. of 6α-fluoro-Δ⁴-pregnen-11β,16α, 17α-21-tetrol-3,20-dione, 200 cc. of anhydrous dioxane and 10 g. of paraformaldehyde there was added 24 g. of anhydrous copper sulfate and the mixture was stirred at room temperature for 24 hours and filtered; the solution was concentrated under reduced pressure, diluted with water and the precipitate was filtered; the product was extracted with methylene chloride, washed with water, dried over anhydrous sodium sulfate and evaporated to dryness. Recrystallization of the residue from ethyl acetate yielded the cyclic 16α,17α-(formaldehyde)-acetal of 6α-fluoro-16α-hydroxy-hydrocortisone.

Example II

By an analogous method to that of Example I, the 21-acetate of 6α-fluoro-Δ⁴-pregnen-11β,16α,17α,21-tetrol-3, 20-dione was converted into the 21-acetate of the cyclic 16α,17α-(formaldehyde)-acetal of 6α-flouro-16α-hydroxy-hydrocortisone.

A suspension of 1 g. of the above compound in 10 cc. of absolute methanol was cooled to 0° C. and mixed with a solution of sodium methoxide prepared by dissolving 60 mg. of sodium metal in 10 cc. of absolute methanol and the mixture was stirred for 1 hour at 0° C. under an atmosphere of nitrogen; it was then poured into 100 cc. of aqueous saturated sodium chloride solution containing 0.3 cc. of acetic acid and the hydrolysis product was extracted with methylene chloride, washed with water, dried over anhydrous sodium sulfate and evaporated. Recrystallization of the residue from acetone-hexane afforded the cyclic 16α,17α-(formaldehyde)-acetal of 6α-fluoro-16α-hydroxy-hydrocortisone, namely 16α,17α-methylenedioxy-6α-fluoro-Δ$^4$-pregnen-11β,21-diol-3,20-dione, which was identical with the compound obtained in accordance with Example I.

*Example III*

Substituting in the reactions of the previous examples the paraformaldehyde for paraldehyde, there were obtained the cyclic 16α,17α-(acetal-dehyde)-acetals of 6α-fluoro-16α-hydroxy-hydrocortisone and of its 21-acetate, respectively.

*Example IV*

In the method of Example II there was substituted 6α-fluoro-Δ$^4$-pregnen-11β,16α,17α,21-tetrol-3,20-dione 21-acetate for its propionate to produce, as an intermediate the 21-propionate of the cyclic 16α,17α-(acetaldehyde)-acetal of 6α-fluoro-16α-hydroxy-hydrocortisone; the propionate group of this compound was hydrolyzed to the hydroxyl group by the treatment with sodium methoxide described in Example II.

*Example V*

A solution of 3 g. of 6α-chloro-9α-fluoro-Δ$^{1,4}$-pregnadien-16α,17α,21-triol-3,11,20-trione in 500 cc. of acetone distilled over calcium chloride was treated with 30 g. of anhydrous copper sulfate and stirred for 48 hours at room temperature; the solid was removed by filtration and washed with acetone and the combined filtrate and washings was dried over anhydrous sodium sulfate and evaporated to dryness, finally in vacuo. The residue was purified by chromatography on 60 g. of washed alumina, thus producing the acetonide, namely the cyclic 16α,17α-isopropylidene-ketal of 6α-chloro-9α-fluoro-16α-hydroxy-prednisone.

*Example VI*

A solution of 1 g. of 6α,9α-dichloro-Δ$^4$-pregnen-16α,17α,21-triol-3,11,20-trione in 100 cc. of acetone was cooled to 0° C., mixed with 15 cc. of saturated acetone solution of dry hydrogen chloride, prepared from acetone distilled over calcium chloride, and the mixture was stirred for 10 minutes at 0° C. 4.5 g. of potassium carbonate in 100 cc. of water was cautiously added, followed by 500 cc. of saturated aqueous sodium chloride solution and the mixture was kept overnight at 5° C. The precipitate was collected, washed with cold saturated sodium chloride solution and then with a little water, air dried and recrystallized from aqueous methanol containing a few drops of pyridine. There was thus obtained the 16α,17α-acetonide of 6α,9α-dichloro-16α-hydroxy-cortisone.

*Example VII*

A stirred mixture of 3 g. of 6α,9α-difluoro-Δ$^4$-pregnen-11β,16α,17α,21-tetrol-3,20-dione and 20 cc. of acetophenone was slowly treated at 0° C. with 0.5 cc. of 72% perchloric acid and the mixture was stirred at 0° C. for 1 hour. After pouring into water, the organic phase was separated, washed with water, dried over anhydrous sodium sulfate and the acetophenone was evaporated under reduced pressure. The residue was chromatographed on 60 g. of neutral alumina, thus yielding the cyclic 16α,17α-methyl-(phenyl)-ketal of 6α,9α-difluoro-16α-hydroxy-hydrocortisone.

To a solution of 1 g. of the above compound in 10 cc. of pyridine there was added 1 cc. of propionic anhydride and kept overnight at room temperature; the mixture was poured into water and the acylation product was extracted with ethyl acetate, washed with water, dried over anhydrous sodium sulfate and evaporated to dryness. Crystallization of the residue from acetone-hexane produced the 21-propionate of cyclic 16α,17α-(methyl-phenyl)-ketal of 6α,9α-difluoro-16α-hydroxy-hydrocortisone.

*Example VIII*

Following the methods of the previous examples, there were obtained the cyclic 16α,17α-acetals and the 16α,17α-ketals of all of the compounds which our method comprises, as well as their 21-esters; there were used the aldehydes and ketones mentioned in the introductory section of this application, as well as, in the esterification step, any anhydride of a carboxylic acid having up to 12 carbon atoms referred to previously such as the benzoate and cyclopentylpropionate.

*Example IX*

A suspension of 6 g. of 9α-fluoro-16α-hydroxy-hydrocortisone in 150 cc. of acetone was treated dropwise and under stirring with 1.5 cc. of 70% perchloric acid. The stirring was continued until the steroid entered into solution and then for 30 minutes further at room temperature; the solution was poured into 5% aqueous sodium bicarbonate solution and the precipitate was collected by filtration, washed with water and dried. The 16,17-acetonide of 9α-fluoro-16α-hydroxy-hydrocortisone obtained in this manner melted between 256 and 260° C. and was of sufficient purity for its use in the subsequent acetylation. A small amount of the product was recrystallized from acetone-hexane to obtain the pure compound, M.P. 270–273° C.

A solution of 6 g. of the 16,17-acetonide of 9α-fluoro-16α-hydroxy-hydrocortisone in 48 cc. of pyridine was treated with 7.6 cc. of acetic anhydride and kept for 24 hours at room temperature. After pouring into ice water, there was collected the crude 21-acetate of 16α,17α-isopropylidenedioxy-9α-fluoro-Δ$^4$-pregnen-11β,21-diol-3,20-dione, namely the acetonide of 9α-fluoro-16α-hydroxy-hydrocortisone. The pure compound was obtained by recrystallization from acetone-hexane, and showed M.P. 246–247° C.; [α]$_D$ +152.3° (chloroform).

*Example X*

A mixture of 3.5 g. of the 21-acetate of 16α,17α-isopropylidenedioxy-9α-fluoro-Δ$^4$-pregnen-11β,21-diol-3,20-dione, obtained in accordance with the previous example, and 100 cc. of 80% acetic acid was slowly treated under stirring with a solution of 600 mg. of chromium trioxide in 7 cc. of acetic acid and 7 cc. of water, maintaining the temperature below 20° C. After 2 hours the mixture was poured into water and the precipitate formed was collected, washed with water, dried and recrystallized from acetone-hexane. There was thus obtained the 21-acetate of the 16,17-acetonide of 9α-fluoro-16α-hydroxy-cortisone.

*Example XI*

16α,17α-ethylidenedioxy-9α-fluoro-Δ$^4$-pregnen-11β,21-diol-3,20-dione, namely the 16,17-acetal of 9α-fluoro-16α-hydroxy-hydrocortisone, was prepared by condensation of the latter with acetaldehyde, following the procedure of Example IX. By acetylation, as described in Example IX, there was obtained its 21-acetate. The hydroxyl group at C–11 was then oxidized to a keto group, in accordance with the method of Example X, to produce the 21-acetate of 16α,17α-ethylidenedioxy-9α-fluoro-Δ$^4$-pregnen-21-ol-3,11,20-trione.

*Example XII*

By substituting in the method of Example IX the acetic anhydride by propionic anhydride, there was obtained the 21-propionate of the 16,17-acetonide of 9α-fluoro-16α-hydroxy-hydrocortisone and then, in accordance with the method of Example X, the 21-propionate of the 16,17-acetonide of 9α-fluoro-16α-hydroxy-cortisone.

*Example XIII*

A solution of 6 g. of the 21-acetate of the 16,17-acetonide of 9α-fluoro-16α-hydroxy-hydrocortisone in 48 cc.

of anhydrous dioxane was mixed with 6 cc. of ethyl orthoformate and 200 mg. of p-toluenesulfonic acid and the mixture was stirred until an emerald green color appeared, which took approximately 30 minutes; there was then added 5 cc. of pyridine, which caused the color to change to yellow. The mixture was poured into water, cooled and the precipitate was collected, washed with water, dried and recrystallized from methanol containing a little pyridine. There was thus obtained the 21-acetate of 3-ethoxy-16α,17α-isopropylidenedioxy-9α-fluoro-Δ$^{3,5}$-pregnadien-11β,21-diol-20-one, M.P. 214–215° C.; [α]$_D$ —4.9° (chloroform); λ max. 290–2 mμ and 294–6 mμ, log E 4.31 and 2.17.

A mixture of 5 g. of the above compound, 140 cc. of acetone, 1.6 g. of anhydrous sodium acetate and 16 cc. of water was cooled to 0° C. and treated with 2.8 g. of N-chlorosuccinimide, followed by 1.6 cc. of glacial acetic acid, under continuous stirring. The mixture was stirred for 2 hours further at 0° C., then poured into water and the precipitate was collected, washed, dried and recrystallized from acetone-ether. There was thus obtained the 21-acetate of 16α,17α-isopropylidenedioxy-6β-chloro-9α-fluoro-Δ$^4$-pregnen-11β,21-diol-3,20-dione; M.P. 180–181° C., [α]$_D$ +63.2° (chloroform); λ max. 238 mμ, log E 4.12.

3.2 g. of the above compound was treated with 24 cc. of dioxane, 3 cc. of ethyl orthoformate and 120 mg. of p-toluenesulfonic acid, as described above for the formation of the 3-ethyleneolether of the compound without the chlorine atom at C–6β; there was thus obtained the 21-acetate of 16α,17α-isopropylidenedioxy-3-ethoxy-6-chloro-9α-fluoro-Δ$^{3,5}$-pregnadien-11β,21-diol-20-one, namely the 21-acetate of the 3-ethylenolether of the 16,17-acetonide of 6-chloro-9α-fluoro-16α-hydroxy-hydrocortisone; M.P. 183–184° C.; [α]$_D$+45.83° (chloroform); λ max. 252 mμ, log E 4.31.

A mixture of 3 g. of the above compound, 50 cc. of glacial acetic acid and 1 cc. of dilute hydrochloric acid was kept for 30 minutes at room temperature and then poured into water. The precipitate was collected, washed with water, dried and recrystallized from acetone-ether, thus yielding the 21-acetate of the 16,17-acetonide of 6α-chloro-9α-fluoro-16α-hydroxy-hydrocortisone; M.P. 155–156° C.; [α]$_D$+90° (chloroform); λ max. 234–6 mμ, log E 4.17.

A mixture of 1 g. of the above compound, 50 cc. of t-butanol, 0.5 g. of selenium dioxide and a few drops of pyridine was refluxed under an atmosphere of nitrogen for 48 hours. The solution was filtered through Celite, washing the filter with ethyl acetate, and the combined filtrate and washings was evaporated to dryness under reduced pressure. The residue was treated with water, the solid was collected by filtration, washed with water, dried and chromatographed on neutral alumina; there was thus obtained the 21-acetate of the 16,17-acetonide of 6α-chloro-9α-fluoro-16α-hydroxy-prednisolone; M.P. 298–300° C.; [α]$_D$+53.5° (chloroform); λ max. 238 mμ, log E 4.17.

*Example XIV*

In the method of Example XIII there was substituted the 21-acetate of the 16,17-acetonide of 9α-fluoro-16α-hydroxy-hydrocortisone by the 21-acetate of the 16,17-acetonide of 9α-fluoro-16α-hydroxy-cortisone; thus there were obtained the compounds mentioned in Example XIII, but having a keto group at C–11 instead of the 11β-hydroxyl group.

*Example XV*

In the methods of Examples XIII and XIV the 16,17-acetonides of the 21-acetates of 9α-fluoro-16α-hydroxy-hydrocortisone and of 9α-fluoro-16α-hydroxy-cortisone were substituted by the respective 16,17-ketals formed with acetaldehyde. There were obtained the final 6α-chloro-9α-fluoro-compounds under the form of the 21-acetates of such acetals.

*Example XVI*

By following the method of Example XIII, but starting from the 21-cyclopentylpropionate of 16α,17α-ethylidenedioxy-9α-fluoro-Δ$^4$-pregnen-11β,21-diol-3,20-dione, there was finally obtained the 21-cyclopentylpropionate of 16α,17α-ethylidenedioxy-6α-chloro-9α-fluoro-Δ$^{1,4}$-pregnadien-11β,21-diol-3,20-dione, namely the 21-cyclopentylpropionate of the 16,17-(acetaldehyde)-acetal of 6α-chloro-9α-fluoro-16α-hydroxy-prednisolone; by following the procedure described in Example X, there was then oxidized the 11β-hydroxyl group, to produce the 21-cyclopentylpropionate of the 16,17-(acetaldehyde)-acetal of 6α-chloro-9α-fluoro-16α-hydroxy-prednisone.

We claim:

1. A compound of the following formula:

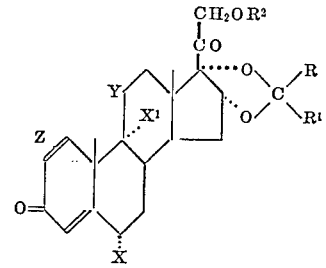

wherein R and R$^1$ are selected from the group consisting of hydrogen and hydrocarbon of up to 8 carbon atoms, X is selected from the group consisting of fluorine and chlorine, X$^1$ is selected from the group consisting of hydrogen, fluorine and chlorine, Y is selected from the group consisting of =O and

Z is selected from the group consisting of a double bond between C–1 and C–2 and a saturated linkage between C–1 and C–2, and R$^2$ is selected from the group consisting of hydrogen and a hydrocarbon carboxylic acyl group of up to 12 carbon atoms.

2. 16α,17α-lower alkylidenedioxy-6α-chloro-hydrocortisone.

3. The 21-monoesters of hydrocarbon carboxylic acids of up to 12 carbon atoms of 16α,17α-lower alkylidenedioxy-6α-chloro-hydrocortisone.

4. 16α,17α-lower alkylidenedioxy-6α-fluoro-hydrocortisone.

5. The 21-monoesters of hydrocarbon carboxylic acids of up to 12 carbon atoms of 16α,17α-lower alkylidenedioxy-6α-fluoro-hydrocortisone.

6. 16α,17α-lower alkylidenedioxy-6α-chloro-cortisone.

7. The 21-monoesters of hydrocarbon carboxylic acids of up to 12 carbon atoms of 16α,17α-lower alkylidenedioxy-6α-chloro-cortisone.

8. 16α,17α-lower alkylidenedioxy-6α-fluoro-cortisone.

9. The 21-monoesters of hydrocarbon carboxylic acids of up to 12 carbon atoms of 16α,17α-lower alkylidenedioxy-6α-fluoro-cortisone.

10. 16α,17α-lower alkylidenedioxy-6α-chloro-prednisolone.

11. The 21-monoesters of hydrocarbon carboxylic acids of up to 12 carbon atoms of 16α,17α-lower alkylidenedioxy-6α-chloro-prednisolone.

12. 16α,17α-lower alkylidenedioxy-6α-fluoro-prednisolone.

13. The 21-monoesters of hydrocarbon carboxylic acids of up to 12 carbon atoms of 16α,17α-lower alkylidenedioxy-6α-fluoro-prednisolone.

14. 16α,17α-lower alkylidenedioxy-6α-chloro-prednisone.

15. The 21-monoesters of hydrocarbon carboxylic acids of up to 12 carbon atoms of 16α,17α-lower alkylidenedioxy-6α-chloro-prednisone.

16. 16α,17α-lower alkylidenedioxy-6α-fluoro-prednisone.

17. The 21-monoesters of hydrocarbon carboxylic acids of up to 12 carbon atoms of 16α,17α-lower alkylidenedioxy-6α-fluoro-prednisone.

18. 16α,17α-lower alkylidenedioxy-6α-chloro-9α-fluoro-hydrocortisone.

19. The 21-monoesters of hydrocarbon carboxylic acids of up to 12 carbon atoms of 16α,17α-lower alkylidenedioxy-6α-chloro-9α-fluoro-hydrocortisone.

20. 16α,17α-lower alkylidenedioxy-6α-chloro-9α-fluoro-cortisone.

21. The 21-monoesters of hydrocarbon carboxylic acids of up to 12 carbon atoms of 16α,17α-lower alkylidenedioxy-6α-chloro-9α-fluoro-cortisone.

22. 16α,17α-lower alkylidenedioxy-6α-chloro-9α-fluoro-prednisolone.

23. The 21-monoesters of hydrocarbon carboxylic acids of up to 12 carbon atoms of 16α,17α-lower alkylidenedioxy-6α-chloro-9α-fluoro-prednisolone.

24. 16α,17α-lower alkylidenedioxy-6α-chloro-9α-fluoro-prednisone.

25. The 21-monoesters of hydrocarbon carboxylic acids of up to 12 carbon atoms of 16α,17α-lower alkylidenedioxy-6α-chloro-9α-fluoro-prednisone.

26. 16α,17α-lower alkylidenedioxy-6α,9α-difluoro-hydrocortisone.

27. The 21-monoesters of hydrocarbon carboxylic acids of up to 12 carbon atoms of 16α,17α-lower alkylidenedioxy-6α,9α-difluoro-hydrocortisone.

28. 16α,17α-lower alkylidenedioxy-6α,9α-difluoro-cortisone.

29. The 21-monoesters of hydrocarbon carboxylic acids of up to 12 carbon atoms of 16α,17α-lower alkylidenedioxy-6α,9α-difluoro-cortisone.

30. 16α,17α-lower alkylidenedioxy-6α,9α-difluoro-prednisolone.

31. The 21-monoesters of hydrocarbon carboxylic acids of up to 12 carbon atoms of 16α,17α-lower alkylidenedioxy-6α,9α-difluoro-prednisolone.

32. 16α,17α-lower alkylidenedioxy-6α,9α-difluoro-prednisone.

33. The 21-monoesters of hydrocarbon carboxylic acids of up to 12 carbon atoms of 16α,17α-lower alkylidenedioxy-6α,9α-difluoro-prednisone.

34. The compound 16α,17α-isopropylidenedioxy-6α,9α-difluoro-1,4-pregnadiene-11β,21-diol-3,20-dione.

35. A compound of the following formula:

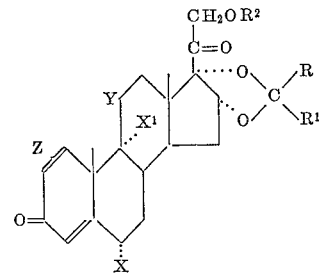

wherein R and $R^1$ are selected from the group consisting of hydrogen, lower alkyl, lower cyclic alkyl and monocyclic aromatic; $R^2$ is selected from the group consisting of hydrogen and a hydrocarbon carboxylic acyl group of less than ten carbon atoms; Y is selected from the group consisting of β-hydroxy and keto; X is selected from the group consisting of fluorine and chlorine and $X^1$ is selected from the group consisting of hydrogen, fluorine and chlorine and Z is selected from the group consisting of a double bond between C–1 and C–2 and a saturated linkage between C–1 and C–2.

References Cited in the file of this patent
UNITED STATES PATENTS

| | | |
|---|---|---|
| 2,838,546 | Magerlein et al. | June 10, 1958 |
| 2,838,548 | Magerlein et al. | June 10, 1958 |
| 2,894,963 | Gould et al. | July 14, 1959 |

OTHER REFERENCES

Mills et al.: J. Am. Chem. Soc., vol. 81 (March 5, 1959), pages 1264 and 1265.

Fried et al.: J. Am. Chem. Soc., vol. 80 (May 5, 1958), pages 2338 and 2339.

Ringold et al.: J. Am. Chem. Soc., vol. 80 (December 5, 1958), pages 6464 and 6465.